Sept. 26, 1950 G. D. OLSSON 2,523,629

ELECTRIC PHONOGRAPH

Filed March 14, 1944 7 Sheets-Sheet 1

Inventor:
Gunnar Daniel Olsson,
by Pierce & Scheffler,
Attorneys.

Sept. 26, 1950 G. D. OLSSON 2,523,629

ELECTRIC PHONOGRAPH

Filed March 14, 1944 7 Sheets-Sheet 2

Inventor:
Gunnar Daniel Olsson,
by Pierce & Scheffler,
Attorneys.

Sept. 26, 1950 G. D. OLSSON 2,523,629

ELECTRIC PHONOGRAPH

Filed March 14, 1944 7 Sheets-Sheet 3

Inventor:
Gunnar Daniel Olsson,
by Pierce & Scheffler,
Attorneys.

Sept. 26, 1950 G. D. OLSSON 2,523,629

ELECTRIC PHONOGRAPH

Filed March 14, 1944 7 Sheets-Sheet 4

Inventor:
Gunnar Daniel Olsson,
by Pierce & Scheffler,
Attorneys.

Sept. 26, 1950 G. D. OLSSON 2,523,629

ELECTRIC PHONOGRAPH

Filed March 14, 1944 7 Sheets-Sheet 5

Inventor:
Gunnar Daniel Olsson,
by Pierce & Scheffler,
Attorneys.

Inventor:
Gunnar Daniel Olsson,
by Pierce & Scheffler,
Attorneys.

Inventor:
Gunnar Daniel Olsson,
by Pierce & Scheffler,
Attorneys.

UNITED STATES PATENT OFFICE 2,523,629

ELECTRIC PHONOGRAPH

Gunnar Daniel Olsson, Stockholm, Sweden

Application March 14, 1944, Serial No. 526,399
In Sweden March 19, 1943

9 Claims. (Cl. 274—10)

The present invention relates to phonographs for playing a plurality of records in sequence in which a pile of records to be played is carried above the turntable of the phonograph and which comprises means to automatically lift the tone arm from the record after playing a record, means to swing it outwards, to deposit a further record of the pile onto the turntable and to restore the tone arm in position for playing the new record.

The main object of the invention is to provide an automatic phonograph in which the various operations needed to effect the automatic shifting of the records are caused by electric means to a great extent and in which the mechanism used in connection therewith is of a simple and compact construction.

A further object of the invention is to provide a phonograph by which records of various size may be played automatically, i. e. in which the pile of records supported above the turntable may contain records of different diameters mixed with each other.

The novel features characteristic of the invention are more particularly set forth in the appended claims. The invention itself, however, both as to its organization and its method of operation, together with additional objects and advantages thereof, will best be understood from the following description of a specific embodiment, when read in connection with the accompanying drawings, in which:

Figure 1:
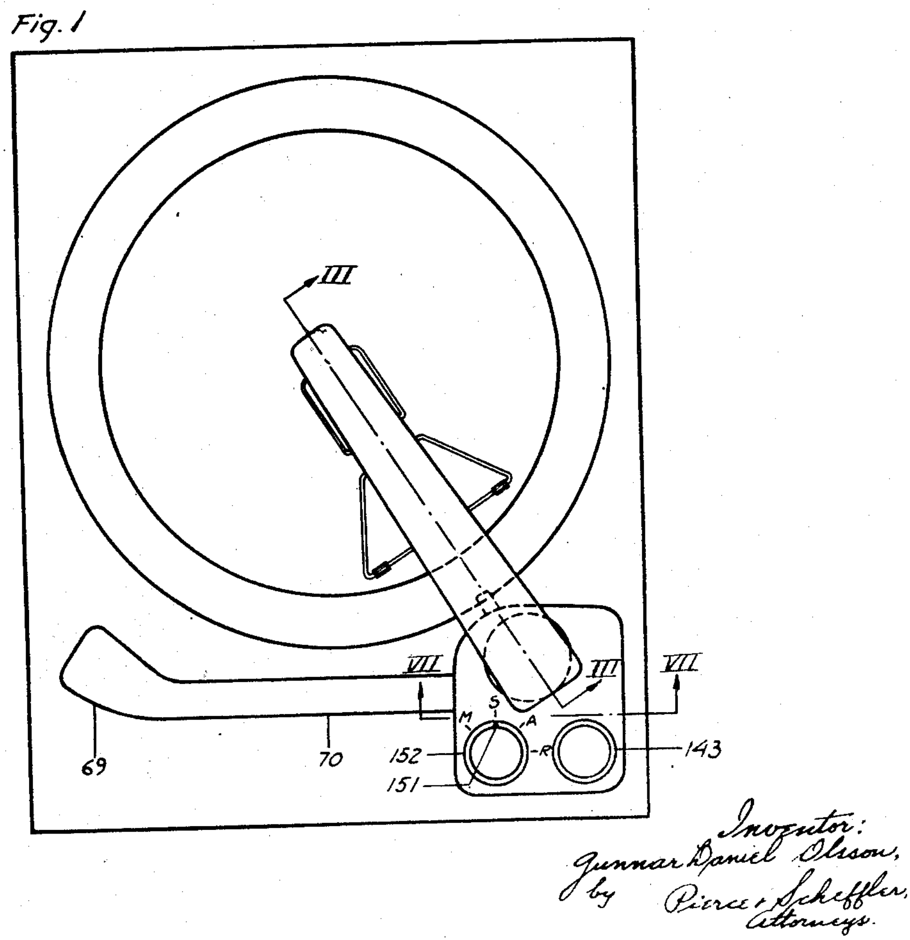
Fig. 1 is plan view of the phonograph.
Figures 5, 6:
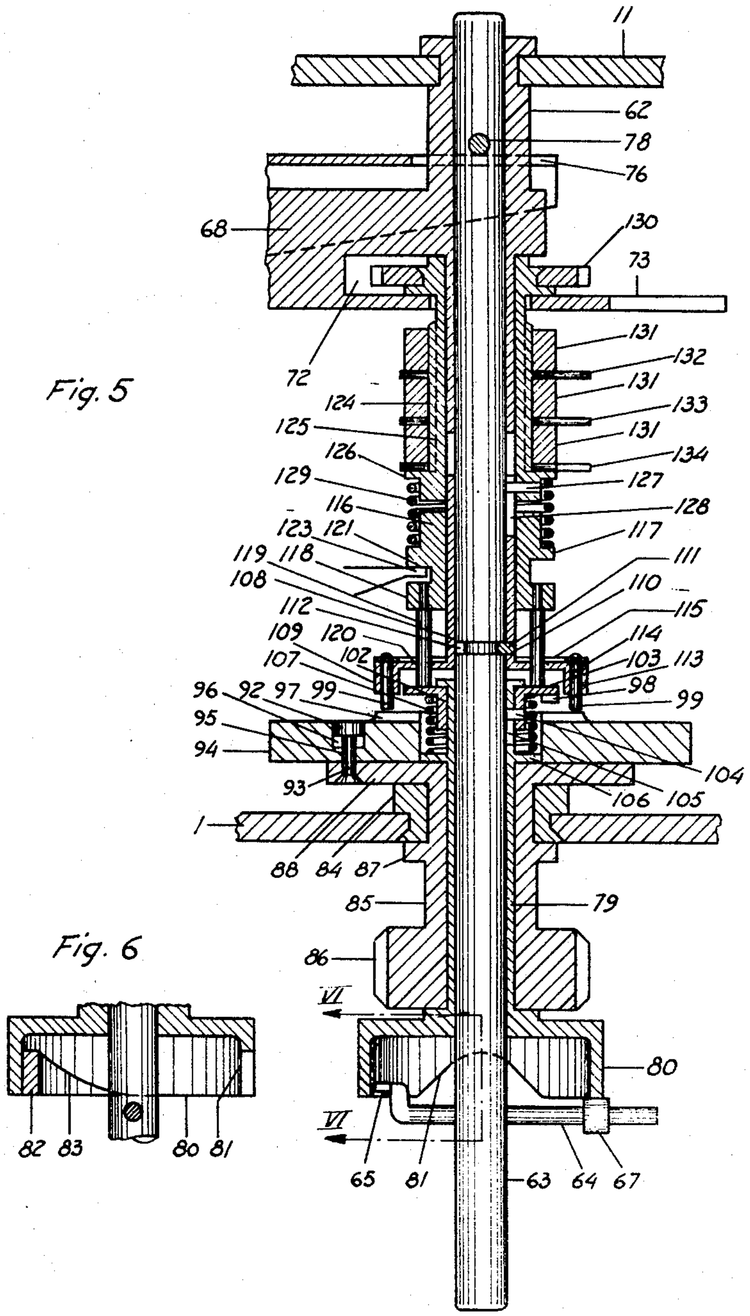
Figure 8:
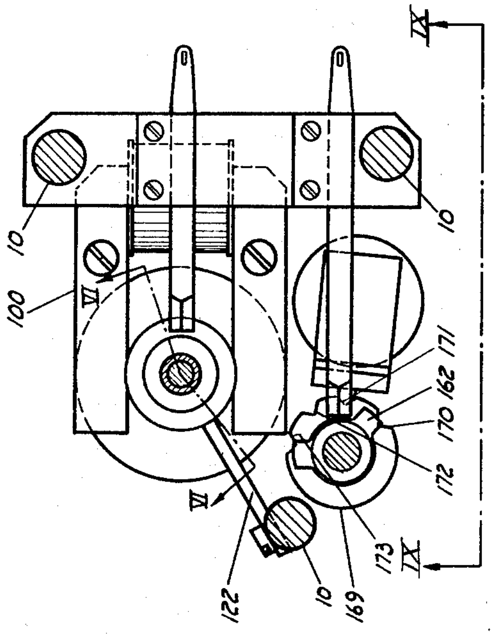
Figure 7:
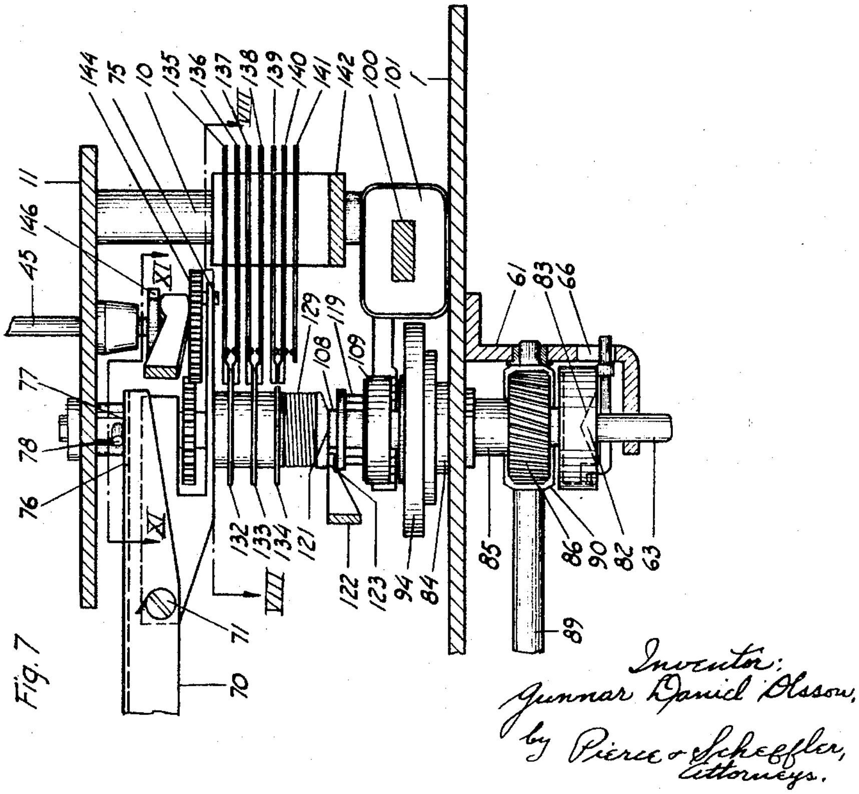
Figure 10:
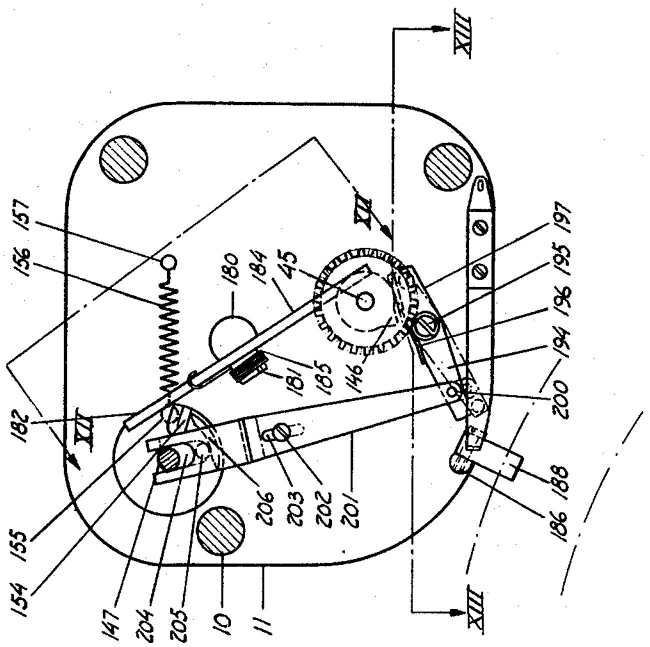
Figure 9:
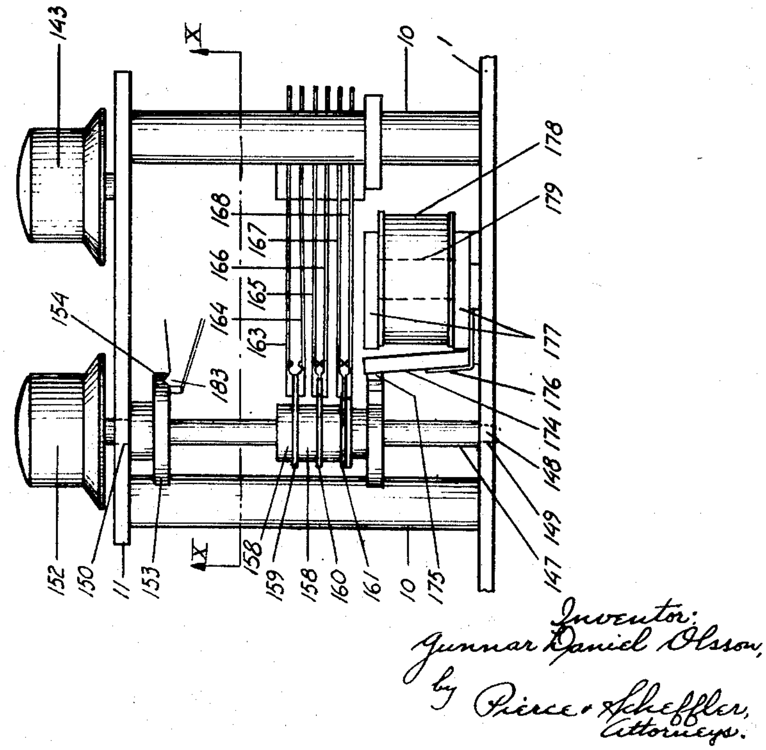
Figure 13:
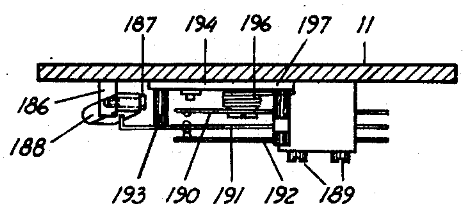
Figure 12:
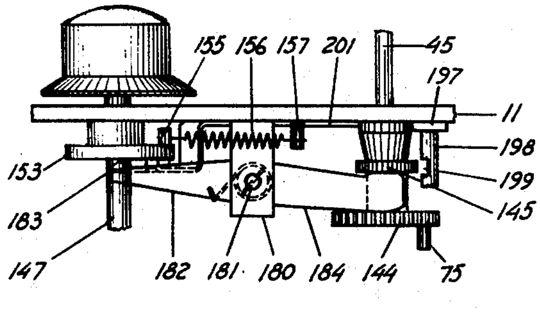
Figure 11:
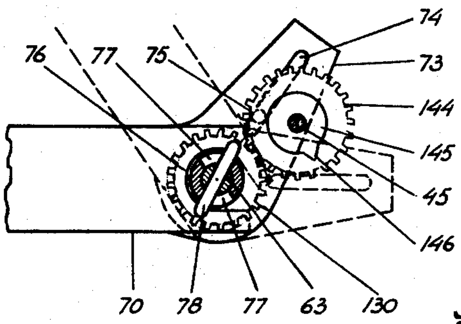
Figure 14:
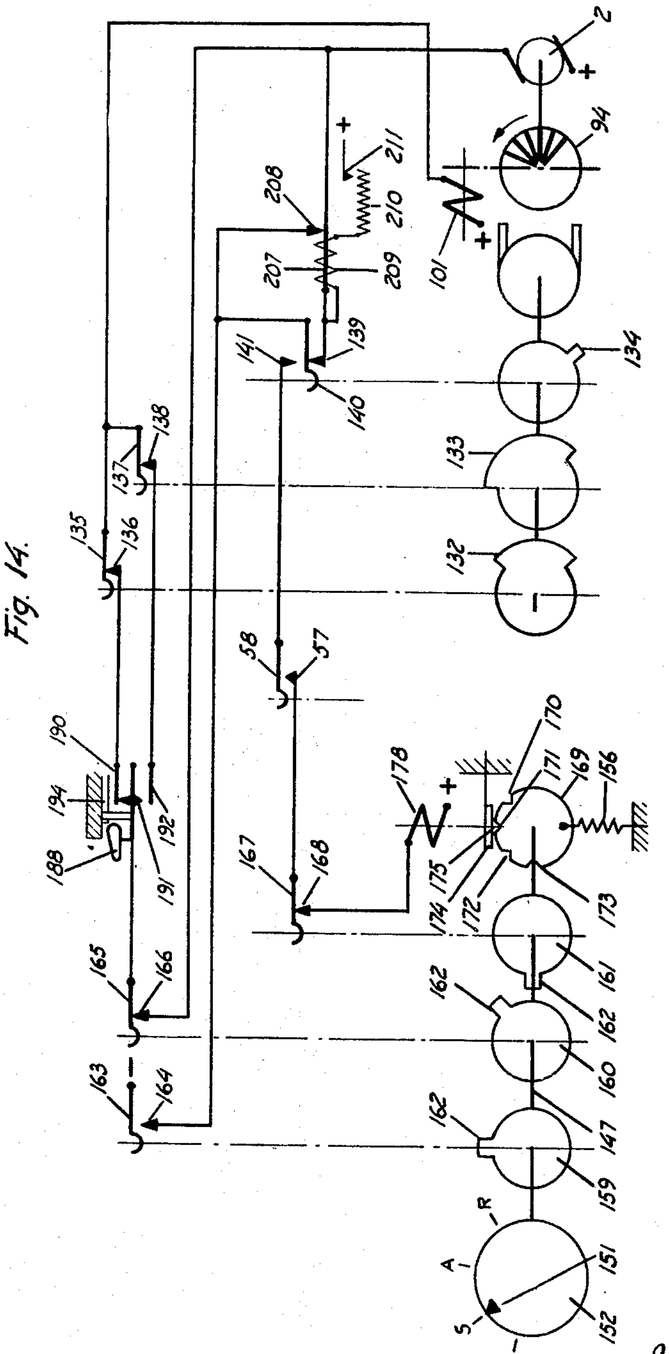

Fig. 5 is a section on line V—V in Fig. 8 illustrating on an enlarged scale a mechanism controlling the movements of the tone arm, Fig. 6 is a section on line VI—VI in Fig. 5, Fig. 7 is a part sectional view on line VII—VII in Fig. 1, Fig. 8 is a sectional view on line VIII—VIII in Fig. 7 as viewed from the top thereof, Fig. 9 is a side elevation on line IX—IX in Fig. 8, Fig. 10 illustrates a section on line X—X in Fig. 9 as viewed from the bottom thereof, Fig. 11 illustrates a section on line XI—XI in Fig. 7 as viewed from the bottom thereof, Fig. 12 is a sectional view on line XII—XII in Fig. 10, Fig. 13 is a sectional view on line XIII—XIII in Fig. 10, Fig. 14 is a diagrammatical illustration of the principle of the operation of the phonograph.

With reference to the drawings 1 denotes a base plate on which an electric motor 2 is secured. Journalled in the casing of the motor 2 is a hollow shaft 3 extending upwardly through a bore in the base plate 1, above which a turntable 4 is removably mounted on the shaft 3. The shaft 3 is operated from the motor 2 by a worm 5 and a worm wheel 6 the latter of which is secured to the shaft 3. Extending through the hollow shaft 3 is a cylindrical stem 7 the lower end of which is secured in the casing of the motor, the top end thereof having two similar recesses 8 and 9 (see Fig. 3) situated equidistantly at the same side of the centre of the stem.

Provided laterally of the pile of records *r* is a stand consisting of posts 10 rising from the base plate 1 and of a plate 11 secured to said posts (Figs. 7, 8, 9). At the top of the stand 10—11 there is mounted a housing 12 upon which is mounted a square piece 13. Pivoted to this piece is an arm 14, 15 extending above the centre of the turntable. Said arm consists of a lower plate 14 of relatively thick sheet metal and tapering towards the free end thereof, said plate forming the carrying portion of the arm, and of a top piece 15 made of thinner sheet metal and formed with U-section. The rear portion of the plate 14 is formed to a fork the legs 16 of which surround the piece 13 mounted on the cover of the housing 12 and are journalled on a shaft 17 mounted in piece 13 and guided in bores in the ends of the legs. The top piece 15 is supported by three short posts 18, 19 and 20 mounted in the plate 14 and having shouldered screws 21 mounted therein. The screws 21 are adapted to guide in slots formed in the longitudinal direction in the top piece 15. The metal is partly removed at the top of the post 20 at one side of its centre perpendicularly to the longitudinal direction of the arms 14, 15. The post 20 has a wide bore 22 formed in the longitudinal direction of the arm.

Secured in the free end of the top piece 15 is an element 23 to which two shouldered screws 24 each guided in a groove in the plate 14 are attached. In the middle between these screws the piece 23 has a bore 25 in which a cylindrical pin 26 is secured. Said pin extends downwardly through a slot 27 formed in the plate 14 longitudinally thereof and guiding said pin. A hole 28 is provided in the pin. A shaft 29 is rotatably mounted in said hole and has the bottom end thereof formed as a conical point 30. The hole 28 has an eccentric position in the pin 26 and is situated so that when the top piece 15 takes a position in which the conical point 30 of the shaft 29 engages the recess 9, the pin 26 stands coaxially with the stem 7.

Figure 3:
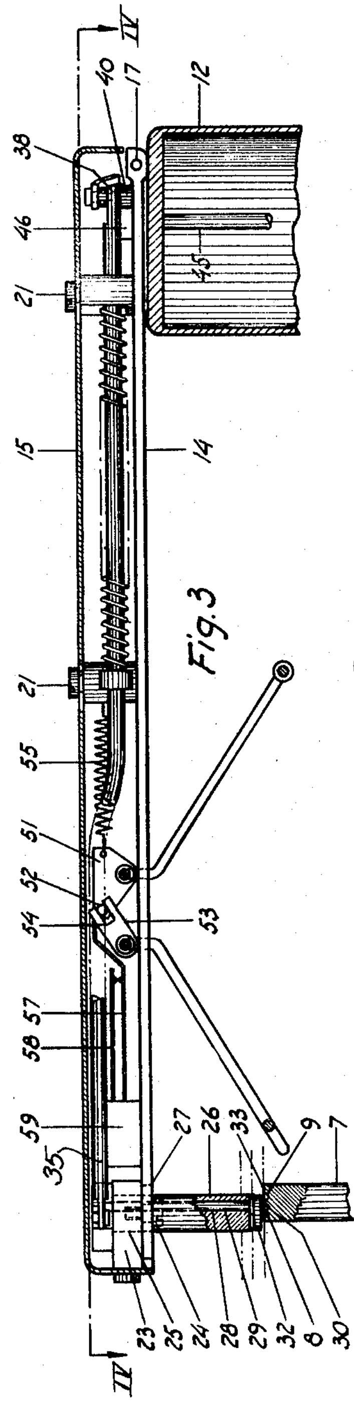
Fig. 3 is a side elevation partly in section on line III—III in Fig. 1.

At its top end the shaft 29 has attached thereto an arm 31 which forms an angle of about 30 degrees with the perpendicular of the longitudinal axis of the arm 14, 15 through the centre of the shaft 29. Mounted at the bottom of the shaft 29 between the stem 7 and the pin 26 is an eccentric 32, the diameter of which is equal to that of pin 26 and stem 7, the thickness being somewhat smaller than that of one record. Said eccentric is adapted to cooperate with the aperture in the temporarily lowermost record of the pile of the records. When the conical point 30 of the shaft 29 is situated in the recess 8 the pin 26 together with the stem 7 forms a supporting member for the pile of records to be played, the pile resting upon the plane surface 33 of the stem 7 to the right of the pin 26 (Fig. 3). Mounted in the outer end of the arm 31 is a stud 34 and pivoted thereto is a rod 35 displaceably arranged in the bore 22 of the post 20. The rod 35 is provided with a flange 36 at some distance in advance of the post 20. A helical spring 37 is mounted on the rod 35 between said flange and the post 20.

A threaded hole 38 is provided in the right end of the rod 35 (Fig. 3). Mounted in this hole is a shouldered screw 39 by which the rod 35 is pivoted to one end of a lever 41 the other end of which is journalled on a pin 40 attached to the cover of the housing 12. At some distance from the pivot 40 of the lever 41 a roller 43 is rotatably mounted on a pin 42.

A shaft 45 extends through an aperture 44 in the plate 14 and is rotatably and displaceably mounted in the housing 12 and in the plate 11. On the portion of said shaft 45 situated above the plate 14 a bush 46 is mounted and has the top thereof formed with a cam 47. Said cam 47 is adapted to engage the roller 43 in such a manner that when at the rotation of the shaft 45 the latter is engaged by the cam 47 the lever 41 is imparted a pushing-away motion during which the spring 37 is strained and the rod 35 is carried to its right end position in Fig. 3.

Figure 4:
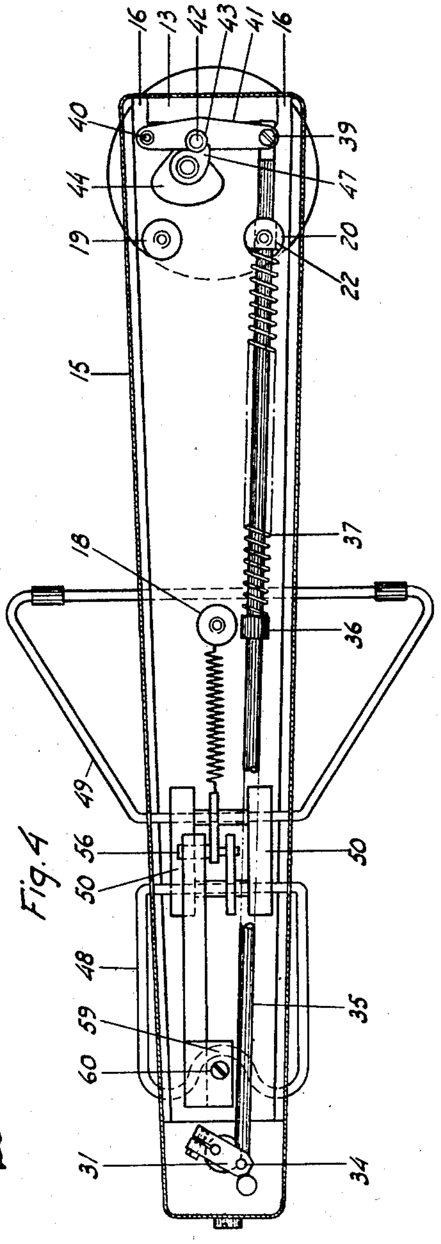
Fig. 4 is a horizontal section on line IV—IV in Fig. 3.

The mechanism for depositing the records operates as follows:

On rotation of the shaft 45 in a clockwise direction in Fig. 4 the cam 47 imparts a pushing-away motion to the lever 41 when it engages the roller 43 and simultaneously the rod 35 compressing the spring 37 is moved to its right end position. The arm 31 is rotated an angle of approximately 60 degrees in an anti-clockwise direction in Fig. 4, and the eccentric 32, bringing along the lowermost record of the pile, is moved to a position in which the eccentric and the aperture of the record lie coaxially with the stem 7 which occurs when the apex of the cam 47 engages the roller 43, whereupon the record to be deposited falls down onto the turntable. When the apex of the cam 47 has passed the roller 43 the latter slides along the rear side of the cam, spring 37 being permitted to expand, pushing rod 35 to the left in Fig. 4 and the arm 31, shaft 29 and eccentric 32 being rotated in a clockwise direction in Fig. 4 until the latter stands coaxially with the pin 26 so that the entire pile of records slides downwardly along pin 26 to engage the plane surface 33 of the stem 7 situated to the right of pin 26 in Fig. 3, and the initial position has been reached again.

The little surface or shoulder 33 is not alone able to keep a record or pile of records in the horizontal position. For this purpose two arms 48 and 49 engaging the top of the pile of records and preferably being actuated by a spring are provided. Said arms engage a record or the pile of records at the portion thereof situated adjacent to the shoulder 33 and counterbalance the tendency of a record or pile of records to tilt at the opposite side. The arms 48, 49 which are preferably bent angularly adjacent to their pivots respectively, take a substantially horizontal position at the maximum height of the pile of records. The arm 48 extending inwardly above the centre of the pile of records is preferably formed as a fork surrounding the pin 26 at the end engaging the pile of records with a view to obtaining an engagement on a line through the centre of the pile of records. The arm 49 extending towards the periphery of the pile of records is preferably formed as trapezoid having its longest side engaging the pile of records at two points. A suitable covering for example in the form of sleeves of india rubber or the like is mounted at the points of engagement with a view to preventing the entire pile of records from being rotated at the movement of the lowermost record. The arms 48, 49 are pivoted to two parallel members 50, 50 attached to the plate 14. On the portion of the arm 49 situated between the members 50, 50 there is attached a piece 51 formed substantially as a right triangle having the point of attachment situated at the apex which is embraced by the legs of the right angle. At the apex of the smallest angle there is a pin 52 adapted to engage a slot 54 of a forked piece 53 attached to the arm 48. In the third apex of the piece 51 there is mounted one end of a cylindrical spring 55 the other end of which is secured in the post 18. The force acting through the spring 55 on the arm 49 is transmitted to the arm 48 by the pin 52 sliding in the slot 54. The connection mechanism between the arms 48, 49 as described enables each movement performed by one arm to be positively performed also by the other.

The other portion of the pin 52 mounted in the piece 51 is provided with an insulating covering in the form of an ebonite tube 56 or the like and adapted to cooperate with one of two contact springs 57 and 58 having point contacts and being secured to a piece 59 of insulating material such as ebonite which is attached to the plate 14 by a screw 60. The springs 57 and 58 are adapted to be disengaged until the last record in the pile has been deposited when by actuation of the spring 55 pin 56 elevates the spring 57 to engage the spring 58 for the purpose more particularly described hereinafter.

An angular member 61 (Fig. 7) is attached to the base plate 1. A lifter 63 is journalled in said angular member and in a sleeve 62 (Fig. 5) rotatably mounted in the stand plate 11, said lifter being displaceable axially and formed as a cylindrical rod. At the bottom the lifter 63 is provided with a horizontal pin 64 carried therethrough and having one end bent to form a bell crank the outermost portion being formed as an edged abutment 65. The other end of the pin 64 is adapted to be guided in a slot 66 formed in the angular member 61. At some distance from the end of the pin 64 engaging the slot 66 there is rotatably mounted a roller 67.

Substantially at the middle the sleeve 62 is formed to a bracket 68 for the tone arm 70 carrying the pick-up of the phonograph and being rotatable vertically on a shouldered bolt 71 which is mounted horizontally in the bracket 68 and is formed as a pivot. A horizontal recess 72 is formed in the bracket 68. The material forming the bottom of said recess is formed as a projection 73 (Fig. 11) extending to the right in Fig. 5 from the tone arm and being provided with a groove 74 intended as a guide groove for a pin 75 imparting the rotary motion to the tone arm and describing a circular path. The groove 74 forms such an angle with the centre line of the tone arm in the horizontal plane that the pin 75 during its circular movement carries the arm from a position in which the stylus is situated at some distance inside the innermost portion of the sound groove of the record to a position in which the tone arm is situated entirely outside a record of large size. In the right end of the tone arm 70 in Fig. 11 there is a recess 76 through which part of the sleeve 62 extends. The sleeve 62 has two vertical diametrically opposite recesses 77, 77 (Fig. 11) which allow the movement of a pin 78 mounted horizontally in the lifter 63 in vertical direction and the rotation of the bracket 68 of the tone arm between the above mentioned end positions. The portions of the pin 78 protruding to the same extent on each side of the sleeve 62 engage the top of the tone arm 70 and actuate the same in such a manner that when the lifter is moved axially downwards the pick-up 69 will be elevated.

A sleeve 79 is rotatably mounted at the bottom of the lifter 63 in Fig. 5. At the bottom thereof said sleeve is provided with a flange 80 which has a recess 81. The flange 80 having the recess 81 is adapted to be engaged by the roller 67. A piece 82 is mounted at the inner side of the flange 80 opposite to the recess 81. As seen in the plan view said piece 82 has substantially the form of an isosceles triangle having the base downwards. The surfaces corresponding to the equal sides 83, 83 of the triangle are adapted to cooperate with the abutment 65. The flange 80, the recess 81, and the edge surfaces 83, 83 of the piece 82 are adapted as guide means at the axial displacement of the lifter 63 in such a manner that when the lifter 63 is in its lower position the roller 67 of the pin 64 engages the flange 80 until the curve 83, 83 meets the abutment 65 when the roller 67 is just sliding into the recess 81, the lifter 63 being elevated to its uppermost position. This position must be reached to obtain disengagement of the lift coupling.

An operating sleeve 85 is rotatably mounted outside the sleeve 79 in a bushing 84 secured to the base plate 1. At the bottom thereof the operating sleeve 85 is formed as a worm wheel 86 and at the top with the two circular flanges 87 and 88 surrounding the bushing 84 and adapted to operate as guides in vertical direction. The operating sleeve 85 is moved from a shaft 89 journalled in the motor casing and in the angular member 61, by means of a worm 90 situated on a shaft 89 and engaging the worm wheel 86. Said shaft is in turn operated by the shaft 3 of the turntable by means of worm wheels 91, 91. The top flange 88 of the operating sleeve has attached thereto two pins 93 having heads 92 (Fig. 5). The shafts of said pins are guided in holes 95 formed at right angles to an armature 94 situated immediately above the flange 88. These holes are countersunk as at 96 to such a depth that the armature 94 can move to a small extent upward in vertical direction. The plane top surface of the armature has a number of radial grooves 97. The grooves 97 are intended to cooperate with teeth 98, 98 and 99, 99 mounted on two couplings situated above the armature 94 and one having the object of moving the tone arm vertically (lift coupling), and the other having the object of moving the tone arm horizontally (turn coupling).

The two legs of an U-shaped electro-magnet, the coupling magnet 100 (Fig. 8), are extended at some distance above the armature 94. The coupling magnet 100 has for its object to attract the armature when the circuit of the coil 101 mounted thereon is closed, whereby the grooves 97 of the armature may be engaged with the teeth 98 of the lift coupling and the teeth 99 of the turn coupling respectively. Which of these couplings will be engaged with the armature 94 in each case will be described more in detail in the following description of the operation of the phonograph.

The lift coupling is formed as a sleeve 102 surrounding the sleeve 79 and mounted displacedly in a vertical direction thereon. The upper portion of the sleeve 102 forms a circular flange 103 which carries the two diametrically opposite teeth 98, 98. The sleeve 102 of the lift coupling is provided with a pin 104 which is adapted to be guided in a vertical groove 105 formed in the sleeve 79 which is forced to follow the rotation of the sleeve 102, the latter being permitted to move simultaneously to an extent in vertical direction required to engage or disengage the teeth 98 respectively with the grooves 97 of the armature 94. A spring 107 surrounding the sleeve 102 and mounted between the flange 103 and a shoulder 106 of the sleeve 79 has a tendency of pressing the lift coupling 102, 103, 98 in upward direction.

The turn coupling consists of a sleeve 108 rotatably mounted on the lifter 63 and, at the bottom thereof, being formed as a drum 109 which surrounds the flange 103 of the lift coupling concentrically. At right angles to the axis of the sleeve 108 said sleeve has a threaded bore 110 in which a bolt 111 is attached, said bolt being adapted to guide in a horizontal recess 112 arranged about the surface of the lifter. The sleeve 108 of the turn coupling thus is free to rotate on the lifter 63 but is forced to take part in the movement thereof in vertical direction. Two vertical bores 113 are formed in the wall of the drum 109 at diametrically opposite positions. A pin 114 is displaceably mounted in each of said holes. The lower ends of said pins are formed as the teeth 99, 99 adapted to engage the groove 97 of the armature. The pins 114, 114 are exposed to the actuation by a spring 115 mounted at the top of the plane portion of the drum and having the tendency of pressing the pins 114, 114 downwards with a view to obtain a resilient engagement of the teeth 99, 99 with the grooves 97 of the armature 94 when the latter is attracted by the coupling magnet 100, 101.

A sleeve 116 surrounds the sleeve 108 of the turn coupling displaceably. The sleeve 116 has two flanges, an upper one 117 and a lower one 118. Attached to the lower flange 118 are four diametrically disposed pins 119 which are displaceable in bores 120 situated in the plane portion of the drum 109. Thus the sleeve 116 is compelled to follow the turn coupling 108, 109, 115, 99 in its rotation. At a certain place the upper flange 117 is provided with a curve 121 adapted as a guide for partial disengagement of the lift coupling for a purpose stated more particularly hereinbelow.

The stand post 10 situated close to the turntable has attached thereto a supporting arm 122 extending radially towards the centre of the turn coupling and having the end thereof formed as an abutment 123 adapted to engage the curve 121 formed on the flange 117. In playing automatically the abutment 123 meets the curve 121 when the tone arm 70 is turned outward and, as a result, the sleeve 116 will be elevated. The sleeve 102 engaging the pins 119 by its flange 103 will follow the sleeve 116 due to the influence by the spring 107 whereby the teeth 98, 98 are disengaged from the grooves 97 of the armature 94 so that the rotation, of the flange 80 ceases, said state being illustrated in Fig. 5. The curve 121 engages the abutment 123 at such an early moment during the outward turn of the tone arm 70 that the abutment 123 has time to pass before the tone arm has reached the extreme position. This break of the rotation of the flange 80 occurs with a view to prevent the tone arm from descending too early in case of a record of small size.

Journalled at some distance above the sleeve 116 on the sleeves 108 and 62 and in the bracket 68 of the tone arm is a sleeve 124 adapted to rotate around the sleeve 62 without possibility of axial displacement. A screw thread 125 is provided at the periphery of the sleeve 124 the bottom of which is formed to an abutment 126. At the bottom of the bore of the sleeve 124 a pin 127 extends radially from the wall thereof. Said pin is guided in a slot 128 formed in the sleeve 108. Thus the sleeve 124 is forced to rotate with the sleeve 108 which is allowed to move axially at the same time. A helical spring 129 is mounted between the abutment 126 of the sleeve 124 and the flange 117 of the sleeve 116; said spring must be of such a strength as to overcome the reaction pressure of the spring 107. At the top of the sleeve 124 a cylindric gear wheel 130 is mounted. Three cams of insulating material 132, 133, and 134 are mounted between annular nuts 131 on the sleeve 124. Such a cam is formed as a projection extending from a circular disk on the level thereof and being limited by an arc concentric with the circular disk. At rotation of the sleeve 124 the cams are adapted to pass between a pair of springs 135 and 136, 137 and 138, and 139 and 140 respectively surrounding the sleeve 124, with a view to breaking the contact between the springs of the pair in question whereby the circuit of the coupling magnet 100, 101 is broken. Mounted below the spring 140 is a relatively rigid spring 141 which is intended to cooperate with the spring 140 in such a manner that the contact therebetween is established when the cam 134 passes between the springs 139 and 140. The springs 135, 136, 137, 138, 139, 140, and 141 are separated from one another and from the plate by means of washers of insulating material and are combined to a group which is attached to a bridge 142 mounted between two of the posts 10.

The shaft 45 is adapted to be driven by the gear wheel 130 (cf. Figs. 7 and 11) constantly meshing with a gear wheel 144 mounted on the lower end of the shaft and provided with a hub. The gear wheel 144 carries the pin 75 cooperating with the groove 74 in the projection 73 of the tone arm bracket. The top of the hub of the gear wheel 144 is formed with a flange 145 which is provided with a cam 146 extending on a level therewith.

An operating shaft 147 (Fig. 9) the lower portion of which is journalled by a pin 148 in a bore 149 formed in the base plate 1 and the top of which is journalled in a bore 150 in the stand plate 11 extends at some distance above the latter and supports, at the top thereof, a hand wheel 152 having an index 151. Mounted on the plate 11 beyond the periphery of the wheel 152 is a scale comprising four positions in which the index 151 of the wheel may be set alternatively and which counted in a clockwise direction in Fig. 1 are denoted M, S, A, R respectively corresponding to the position of the operating shaft in playing manually, in stopping position, in playing automatically and in playing repeatedly (repeating). Close below the plate 11 a circular disk 153 having a hub is attached to the shaft 147. At the periphery said disk has a recess 154 and at the plane top portion it has a pin 155 in which one end of a cylindrical spring 156 is attached (Fig. 12). The other end of the spring 156 is attached to a pin 157 mounted in the plate 11. Said spring has a tendency of restoring the operating shaft to the stop position. A screw thread is provided at some distance lower on the operating shaft 147. Between annular nuts 158 mounted on the latter there are three substantially circular disks 159, 160 and 161 of insulating material. Each of said disks is provided with a lap 162 extending on a level with the disk. These disks are placed so that the laps have been displaced relatively to one another the number of degrees which corresponds to the position of the operating wheel on the positions M, S, and R respectively. The laps 162 of the disks 159, 160, and 161 are adapted to cooperate with three pair of contact springs 163—164, 165—166, and 167—168 mounted in the path of motion of the laps. Said springs are V-shaped in section and have point contacts which are closed in their unactuated position but on setting the wheel 152 to an operating position become separated by the introduction of the lap in question between the springs thereof.

A circular disk 169 is mounted on the shaft 147 in spaced relation below the disk 161. Said former disk is provided with four notches 170, 171, 172, and 173 at the periphery thereof (cf. Figs. 8, 9, and 14). Said notches are intended to cooperate with a wedge-shaped pawl 175 attached to a magnet armature 174 formed substantially as a square plate in close proximity of the disk 169. The notches 170—173 represent in their cooperation with the pawl 175 in the mentioned order a manual stopping position, an automatic position and a repeating position respectively. The armature 174 is carried by a flexible leaf spring 176 secured to the base plate 1 and is adapted to be attracted by one adjacent iron plate 177 of two such plates and an electro-magnet consisting of a bolt 179 connecting said plates 177 and carrying a coil 178. The electro-magnet has for its object to disengage the disk 169 from the pawl 175 on energizing so as to restore the disk to its stopping position by influence of the spring 156.

A short post 180 is mounted below the plate 11 (Figs. 10 and 12) substantially at the middle of the distance between the operating shaft 147 and the shaft 45. Journalled on a horizontal shouldered bolt 181 secured to said post is a double-armed lever having one arm 182 tapering towards the end and extending below the disk 153 on the operating shaft 147. The end of the arm 182 is formed as an upstanding projection 183 which may be engaged with the recess 154 of the disk 153. The other arm 184 of the lever extends between the flange 145 and the gear wheel 144. The arm 182 is exposed to the actuation of a spring 185 surrounding the shouldered bolt 181 and having a tendency of pressing the arm 182 upward whereby when the cam 183 engages the plane surface of the disk 153, the shaft 45 is maintained in an elevated position, and when the cam 183 by rotating the operating shaft to the position in which the cam 183 by the influence of the spring 185 engages the recess 154 the shaft 45 is moved to its lower position. The vertical movement of the shaft 45 must not be so long as to disengage the gear wheels 130 and 144.

A pin 186 (cf. Figs. 10 and 13) is mounted at the edge of the plate 11. A lever 188 of insulating material is rotatably mounted on a shouldered screw 187 inserted in the pin 186 so that a small portion of the lever is situated in the path of records of the big size descending from the pile of record. A group of springs attached to the plate 11 by two screws 189 consists of three point contact springs 190, 191, and 192 which are separated from one another and from the plate 11 by washers of insulating material. The middle spring 191 extends forward below the lever 188 and has its end bent at right angles to form an angular portion, the free leg of which engages the bottom of the lever 188. The point contacts of the springs 190 and 191 engage each other in the un-excited position. The point contacts of the springs 191 and 192 are brought into contact with each other when 190 and 191 are separated, the spring 191 being actuated by the lever 188. A block 193 of insulating material is mounted on the spring 191, and when said spring is unactuated said block engages the plate 11 by its upper end but when the lever 188 is actuated an aperture is created adjacent to the plate 11 for one arm 194 of a double armed lever 194, 197, said arm 194 being moved into the space between the block 193 and the plate 11 by a spring 196, whereby the spring 191 will be shifted from contacting the spring 190 to engage the spring 192 for the purpose more particularly described hereinbelow (Fig. 13).

The last mentioned lever 194, 197 is pivoted to a vertical shouldered bolt 195 attached to the plate 11, and is actuated by a spring 196 surrounding said bolt and having a tendency of rotating the lever in an anti-clockwise direction in Fig. 10. Mounted in the end of the other arm 197 of the lever and extending downwardly therefrom is a pin 198 (Fig. 12) which has a recess through which the cam 146 is free to pass when shaft 45 is in the upper position (the repeating position). On the contrary when the shaft 45 by operation by the lever 182—184 is moved to the lower position (position for playing automatically) the cam 146 is engaged with the pin 198 on turning the tone arm 70 outwards so as to impart a pushing away motion to said pin, the arm 194 being moved from the position in which it is situated between the plate 11 and the block 193 to an ineffective position.

When the operating wheel is restored from a playing position to the stopping position, the arm 194 situated between the block 193 and the plate 11 must be restored to the ineffective position so that at the next playing period, if the record deposited initially be of small size, the tone arm will be restored after turning outwards to a position for playing this record. For this purpose there is a particular releasing mechanism which is constructed as follows (Figs. 10 and 12).

A strip 201 pivoted at one end thereof to the arm 194 by a pin 200 extends below the plate 11 and is displaceable in its longitudinal direction on a shouldered headed bolt 202 secured in the plate 11 and being guided in a slot 203 formed in the strip 201. At the other end the strip is bent in such a way that it reaches a plane situated below the disk 153 on the operating shaft 147. Spaced from the recess 204 a pin 205 is attached to the strip 201 and extending towards the disk 153, said pin being adapted to cooperate with a cam 206 mounted on the disk 153. If in playing automatically the last record should be of large size, the arm 194 is situated in the position shown in dotted lines in Fig. 10 during playing. When the stylus reaches the last turn of the sound groove the circuit of the coil 178 of the electromagnet 177, 177, 179 is closed in a manner described more particularly hereinbelow. Simultaneously the armature 174 releases the disk 169 and the operating shaft returns to the stopping position through actuation by the spring 156, the cam 206 engaging the pin 205 so that the strip 201 is displaced towards the shaft 147 taking along the arm 194 to the position shown in full lines in Fig. 10, the spring 191 returning to its initial position and the spring 196 being strained.

To obtain a short interruption (pause) between the various records in playing automatically there is a device associated with the circuit between the contacts 140—139 and the motor 2 (Fig. 14). This device consists of a bimetallic spring 207 arranged so as to deviate, at heating, from a spring contact 208, engaging it by means of a point contact, so that the contact therebetween will be broken, and a heating element 209 mounted around the bimetallic spring 207 and being coupled in series with a series resistance 210 with which a slide contact 211 connected with the plus pole-terminal is intended to be engaged. The duration of the pause may be controlled by the series resistance 210 and the slide contact 211 which is controllable by means of a hand wheel 143. The operation of the apparatus will be described more particularly hereinafter.

The handling and operation of the described phonograph is as follows.

For the description of the operation of the phonograph reference is had, in addition to the above mentioned figures, also to Fig. 14 which in a principally diagrammatic view illustrates the electric course and the circuits which are effective in the various operations. Reference will be made at the same time to the designations of the diagram corresponding to those used in the above description.

Figure 2:
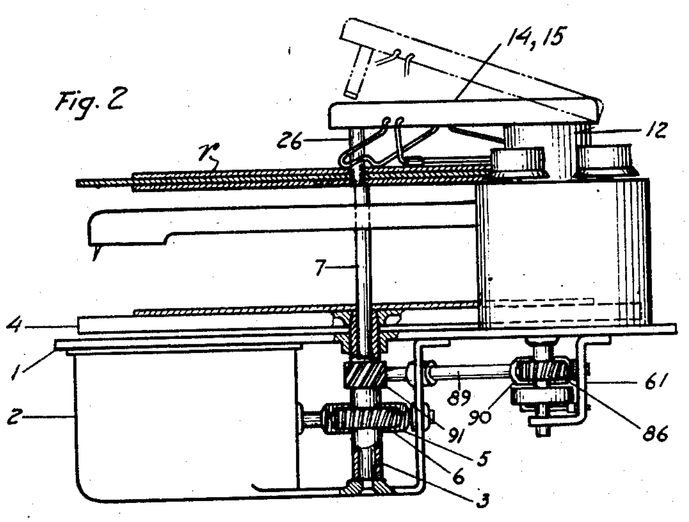
Fig. 2 is a side elevation with certain parts shown in section.

The tone arm 70 is in its outermost position. The supporting arm 14, 15 is turned up to the position indicated by dotted lines in Fig. 2 and in which it is maintained by a device provided therefore but not illustrated in the drawing. Initially the records to be played are mounted on the stem 7 in the desired succession whereupon the arm 14, 15 is turned down and the top piece 15 is displaced somewhat towards the pivot of the arm 14, 15 so that the conical point 30 of the shaft 29 engages the recess 9 of the stem 7 and the pin 26 stands concentrically to the stem 7. The pile of records is then elevated to a position above the stem 7 on the pin 26 whereupon the pile of record is imparted a push so that the tapering point 30 of the shaft 29 engages the recess 8, the pile then being deposited to rest on the plane surface 33 of the stem 7 to the right of the pin 26. As shown in Fig. 2 the temporarily lowermost record of the pile is of small size.

Assume that automatic playing has been chosen. The operating wheel 152 is turned so that its index 151 coincides with the position A. The pawl 175 of the armature 174 is now engaging the locking notch 172 of the disk 169 (Fig. 14), and the cam 183 of the lever 182, 184 (Figs. 9 and 10) engages the recess 154 of the disk 153, i. e. the shaft 45 is in its lower position whereby on rotation of the shaft 45 the cam 146 may be brought to cooperate with the pin 198 (Fig. 12) of the lever 194, 197. Since the lap 162 of the disk 159 is being disengaged from the springs 163 and 164 contact will further be obtained between the latter (Figs. 9 and 14) the motor being switched on through the following circuit: 163—164, 140—139 and parallel with the latter 208—207, the motor 2, the plus pole, and rotates the armature 94 and the turntable 4.

It is now assumed that the tone arm during playing a record of small size (10″) is in a position with the stylus in the sound groove at its last turn on the central portion of the record. As the last turn is reached the cam 132 is disengaged from the springs 135 and 136 whereby contact is obtained therebetween. The coupling magnet 100, 101 is then energized and a circuit is established as follows: 163—164, 140—139 and parallel with the latter 208—207, 166—165 191—190, 136—135, the coil 101, the plus pole so that the armature 94 is attracted. The roller 67 of the pin 64 mounted on the lifter 63 is in the bottom of the recess 81. Thus the lifter is in its uppermost position and the turn coupling 108—109, 99 is at its maximum height, so that the teeth 99, 99 are released from engagement with the armature 94. As a result the grooves 97 of the armature 94 are engaged with the teeth 98, 98 of the lift coupling. Said coupling 102, 103, 98 and the sleeve 79 with the flange 80 is now taken along at the rotation of the armature. The roller 67 on the pin 64 is forced out of the recess to engage the flange 80. The lifter is then moved downwardly the tone arm being elevated to its upper position. Substantially at the same time as the tone arm reaches its upper position and the lifter its lower position and thus the turn coupling its lower position the teeth 99, 99 of the former are engaged with the groove 97 of the excited armature and the turn coupling is rotated. As a result the sleeve 124 is taken along and the rotary motion thereof is transmitted by the rear wheel 130 to 144, the pin 75 secured thereto imparting the rotary motion to the tone arm so that the latter is first turned to some extent towards the centre of the turntable before it returns to begin its outward rotation. Due to the fact that the cam 121 of the sleeve 116 engages the abutment 123 situated in the path of motion thereof, the sleeve 116 is elevated so that by influence of the spring 107 the lift coupling 102, 103, 98 is elevated from engagement with the excited armature 94 whereby the sleeve 79 with the flange 80 is stopped for the purpose stated above.

The record releasing mechanism is actuated in the manner described hereinbefore, when the tone arm is being turned outward.

Just before reaching the outer position the cam 121 of the sleeve 116 passes the abutment 123, whereby under influence of the spring 129 the sleeve 116 is pressed downwards and the pins 119 engaging the flange 103 against the action of the spring 107 presses the lift coupling to engage the excited armature 94, whereby the sleeve 79 with a flange 80 is rotated again. The tone arm continues its outward rotation until reaching the outer position whereupon the inward rotation is started. The rotary motion continues until the stylus is positioned above the initial turn of the sound groove of the record just deposited on the turntable said record being assumed to be of small size, when the cam 132 moves into the space betwen the springs 135 and 136, so that the circuit of the coil 101 is interrupted and the armature descends and is disengaged from the teeth 99, 99, so that the rotation of the turn coupling 108, 109, 99 and in consequence the inward rotation of the tone arm ceases while the sleeve 116 by influence of the spring 129 which is stronger than the spring 107 is pressed downwards, the teeth 98 maintaining their engagement with the grooves 97 of the armature 94. During the continued rotation of the flange 80 the curve 83 engages the abutment 65 of the pin 64 at the same time as the roller 67 slides into the recess 81 whereby the tone arm is lowered so as to engage the stylus with the sound groove, and the playing begins. During the further movement of the lifter 63 upward as the roller 67 reaches the bottom of the recess 81 and the abutment 65 reaches the most projecting portion of the curve 83 the flange 109 engages the flange 118 and pushes the sleeve 116 in upward direction, compressing the spring 129. The lift coupling 102, 103, 98 engaging the pins 119 is elevated due to the action of the spring 107 to disengage the teeth 98, 98 from the grooves 97 of the armature 94, the displacement of the lifter in the upward direction being stopped. The lift coupling as well as the turn coupling is now released from engagement with the armature 94 which however is still rotating.

When the stylus is running in the sound groove of the record, the tone arm is imparted a successive rotary motion inward, the gear wheel 144 being imparted in a clockwise motion through the pin 75 running in the groove 74 of the projection 73 of the tone arm bracket and rotates the gear wheel 130 in a counter-clockwise direction in Fig. 11. This continues until the stylus runs into the final turn of the sound groove on the central portion of the record, when the cam 132 is disengaged from the springs 135 and 136, whereby contact is obtained therebetween, the circuit of the coupling magnet 100, 101 being then closed again, and the armature being attracted, the tone arm being elevated and starts its rotary motion. During the outward rotation of the tone arm the record releasing mechanism is actuated in the manner described above.

The now deposited record which is assumed to be of larger size (12″) actuates the lever 188 in descending, the lever in turn actuating the spring 191 in such a manner that the latter from having been engaging the spring 190 is rapidly shifted to engage the spring 192 which is coupled to the contact 138—137. At the actuation of the lever 188 on the spring 191 a space arises between the block 193 attached to the latter and the plate 11, the arm 194 being introduced into said space through the influence of the spring 196 to maintain the spring 191 temporarily in contact with the spring 192 (cf. Fig. 13). The coupling magnet 100, 101 is now energized through the following circuit: 163—164, 140—139 and parallel with the latter 208—207, 166—165, 191—192, 138—137, coil 101, plus pole. The tone arm is turned to the outer position whereupon the inward rotation begins.

When the stylus is situated opposite to and above the initial turn of the sound groove of the record, the cam 133 runs in between the springs 137 and 138, the circuit of the coil 101 being interrupted and the armature 94 descending to be disengaged from the teeth 99, 99 so that the inward turning of the tone arm stops. The flange 80 continues its rotation until the abutment 65 of the pin 64 runs up to the curve 83, and at that time the roller 67 slides into the recess 81, the tone arm being lowered so as to engage the stylus with the sound groove of the record. Playing begins, and the rotation of the flange 80 will then stop as stated above. When the stylus after finished playing of the record runs into the final turn of the sound groove on the central portion of the record, the cam 133 is disengaged from the springs 137 and 138 so that contact is obtained therebetween. The coupling magnet 100, 101 is now energized through the following circuit: 163—164, 140—139, and parallel with the latter 208—207, 166—165, 191—192, 138—137, the coil 101, the plus pole so that the armature 94 is attracted and the elevation of the tone arm starts.

The process of lifting the tone arm and turning it out to the outer position is the same as that described above whereas it is to be noted that in the present case the pin 198 of the lever 197 is positioned in the path of motion of the cam 146 (cf. Figs. 10 and 12), the latter actuating the pin 198 at the outward rotation of the tone arm, in such a manner that this arm is pushed away, the lever 194, 197 being rotated in a clockwise direction in Fig. 10 so that the arm 194 is moved from the position between the plate 11 and the block 193 (Fig. 13) to an inoperative position.

The above described operations are repeated with all of the records in succession until the last but one record has been played.

After the last record has been fed down, the contact 57—58 is closed to prepare the closure of the circuit of the magnet 178 said circuit, however, being still interrupted until the last record has been played, and at that time the contact 140—141 in the circuit of the magnet coil 178 is closed for a short while so that the magnet 177, 178, 179 is energized and attracts its armature 174 which releases the disk 169 from engagement with the pawl 175. At that time the operating shaft 147 is restored by the action of the spring 156 to the stopping position, the contact 163, 164 being interrupted whereby the current is broken. The tone arm will now stop the stylus being in the final turn of the sound groove on the central portion of the record. If repeated playing (repeating) of a record on the turntable is desired, the operating wheel 152 is turned so that its index coincides with the position R on the scale, whereby the pawl 175 of the armature 174 is engaged with the locking notch 173 of the disk 169 and the lap 162 of the disk 161 with the springs 167—168 so that the contact therebetween ceases with a view to prevent the operating shaft 147 from being restored to the stopping position in playing the last record, when the stylus runs into the final turn of the sound groove in the central portion of the record. In the position R the cam 183 of the lever 182, 184 engages the plane surface of the disk 153, whereby the shaft 45 is maintained in an elevated position (cf. Fig. 12) so that the cams 47 and 146 are not able to cooperate with their respective members 43 and 198 intended for automatic playing so that a release of record does not occur and if the record in question is of the larger size, interruption of the contact 191—192 is prevented.

If in playing a pause is desired between the various records the series resistance 210 is cut in by the slide contact 211 carried by the wheel 143 so that the heating element 209 is energized through the following circuit: 163—164, 140—139, the heating element 209, the series resistance 210, 211, plus pole. Being heated the heating spring 207 is deflected in such a manner, that the engagement with 208 will be interrupted. After the record has been played, the contact 140—139 is interrupted, the heating element 209, the motor 2 and the coil 101 of the coupling magnet becoming currentless. When the armature 94 of the coupling magnet descends the cam 134 driven by the turn coupling is immediately stopped so that the contact 140—139 will be still interrupted. When the bimetallic spring 207 cools, it returns successively to engage 208. Current is now admitted to the motor through the following circuit: 163—164, 208—207, the motor 2, the plus pole, and the coupling magnet through the circuit: 163—164, 208—207, 166—165, 191—190, 136—135, the coupling magnet 101, the plus pole, or the minus pole, 163—164, 208—207, 166—165, 191—192, 138—137, the coupling magnet 101, the plus pole, depending upon whether the record last played was of small or large size. Simultaneously the heating element 209 is energized through the following circuit: 163—164, 208—207, the heating element 209, the series resistance 210, the slide contact 211, the plus pole.

The turn coupling is connected with the operating motor in the manner described above, when the coupling magnet attracts its armature.

When the cam 134 leaves the position in which it is situated between the springs 139 and 140, contact is established therebetween so rapidly that when due to the renewed heating of the heating element the contact between 207—208 ceases, the current to the motor and the coupling magnet has no time to be interrupted. The outward rotation of the tone arm, the deposit of a new record and the restoration of the tone arm to a position for playing said record occurs in the way described above. The process is repeated with all the records in succession so long as 210 is connected with 211.

It is clear that in addition to the embodiment described above by way of example hereinbefore a plurality of modifications having different constructions of the various details may be provided without departing from the principle of the invention.

Thus for example the tone arm may be constructed to directly actuate the spring groups 135—136, 137—138 and 139—140—141 and to restore the contact 190—191—192 adapted to be actuated on depositing a record of larger size, from the locking position described above.

Likewise the members described hereinbefore and cooperating with the rotary sleeve imparting the successive motions to the tone arm and adapted to actuate the eccentric are only intended to relate to an example, and the details may be varied in many respects in an industrial manufacture of the subject of the invention to comply with the requirements of the manufacture, as well as also the unit assembled by said details may have a different position relatively to the plane of the turntable. Furthermore said unit and the tone arm may be placed at different points on the base plate with a connection member imparting the movements to the tone arm being arranged therebetween.

The operating member in the present case consisting of a shaft and details cooperating therewith may of course be arranged as a set of keys with the corresponding functions, should particular reasons hereto occur.

As shown in Fig. 14 this first embodiment is constructed for direct current but it may also be arranged for alternating current operation, for example by associating a current changer with the coupling magnet.

What I claim is:

1. In an automatic phonograph, a turntable for receiving a record, a tone arm cooperative with said turntable for playing the record, means for actuating said tone arm including a turn coupling for effecting a swinging motion of said tone arm and a lift coupling for raising and lowering said tone arm, a clutch controlled drive mechanism, an electromagnet and energizing circuit therefor, said electromagnet being effective when energized to clutch in said lift coupling to said drive mechanism, means actuated by and upon motion of said lift coupling for clutching in said turn coupling to said drive mechanism, and switch means in said circuit actuated by said turn coupling for controlling energization of said electromagnet.

2. An automatic phonograph as defined in claim 1 and which further includes an electrical time delay mechanism interposed in the energizing circuit of said electromagnet, and second switch means controlled by said turn coupling for rendering said time delay mechanism effective.

3. An automatic phonograph as defined in claim 2 wherein said time delay mechanism is comprised of a bimetallic switch member connected in the energizing circuit of said electromagnet, and a heater circuit for said switch member controlled by said second switch means.

4. An automatic phonograph as defined in claim 1 and which further includes a time delay mechanism for effecting a pause between the playing of successive records, said delay mechanism including switch means interposed in the circuit of said electromagnet and actuated by said turn coupling, a bimetallic switch member and a contact cooperative therewith connected in parallel with said switch means, a heating element for said bimetallic member and an energizing circuit for said heating element controlled by said switch means and including means for varying the current applied thereto.

5. In an automatic phonograph for playing a plurality of records in sequence, a turntable, means for supporting the records above said turntable, a record release device operable to release the records in sequence from said supporting means onto said turntable, a tone arm cooperative with said turntable for playing the records, means for actuating said tone arm including a turn coupling for effecting a swinging motion of said tone arm and a lift coupling for raising and lowering said tone arm, means actuated by said turn coupling for operating said record release device, a clutch controlled drive mechanism, an electromagnet and energizing circuit therefor, said electromagnet being effective when energized to clutch in said lift coupling to said drive mechanism, means actuated by and upon motion of said lift coupling to clutch in said turn coupling to said drive mechanism, and switch means controlled by said turn coupling for controlling the energizing circuit of said electromagnet, said switch means including two sets of switch contacts operable to deenergize said electromagnet at different positions of said tone arm corresponding to different sized records, and circuit selecting means controlled by and in accordance with the size of the record next to be played for placing one or the other of said sets of switch contacts in the energizing circuit of said electromagnet.

6. In an automatic phonograph for playing a plurality of records in sequence, a turntable and electric driving motor therefor, means for supporting the records above said turntable, a record release device operable to release the records in sequence from said supporting means onto said turntable, a tone arm cooperative with said turntable for playing the records, means for actuating said tone arm including a turn coupling for effecting a swinging motion of said tone arm and a lift coupling for raising and lowering said tone arm, means actuated by said turn coupling for operating said record release device, a clutch controlled drive mechanism powered from said driving motor, an electromagnet and energizing circuit therefor, said electromagnet being effective when energized to clutch in said lift coupling to said drive mechanism, means actuated by and upon motion of said lift coupling to clutch in said turn coupling to said drive mechanism, and switch means in said circuit and actuated by said turn coupling for controlling energization of said electromagnet.

7. An automatic phonograph as defined in claim 6 and which further includes a manually operated master control switch having contact means in the energizing circuit of said electromagnet, and second contact means in the energizing circuit of said motor.

8. An automatic phonograph as defined in claim 7 and which further includes electro-responsive means for resetting said master control switch to a position wherein said second contact means is open to thereby stop said motor, and an energizing circuit for said resetting means including a set of contacts actuated by said turn coupling and another set of contacts actuated upon release of the last record held by said record supporting means.

9. An automatic phonograph as defined in claim 6 and which further includes a manually operated master control switch having contact means in the energizing circuit of said electromagnet, and second contact means in the energization circuit of said motor, means biasing said master switch to a position wherein said second contact means is open to thereby stop said motor, means for holding said master switch in any selected position against the action of said biasing means, electro-responsive means for releasing said holding means, and an energizing circuit for said releasing means including a set of contacts actuated by said turn coupling and another set of contacts actuated upon release of the last record held by said record supporting means.

GUNNAR DANIEL OLSSON.

(References on following page)

REFERENCES CITED

The following references are of record in the file of this patent:

UNITED STATES PATENTS

| Number | Name | Date |
|---|---|---|
| 1,321,852 | Rorison | Nov. 18, 1919 |
| 1,334,076 | Brown | Mar. 16, 1920 |
| 1,661,103 | Appelberg | Feb. 28, 1928 |
| 1,931,487 | Collison et al. | Oct. 24, 1933 |
| 1,954,247 | Jones et al. | Apr. 10, 1934 |
| 1,970,691 | Collison et al. | Aug. 21, 1934 |
| 2,263,643 | Offen | Nov. 25, 1941 |
| 2,287,726 | Cranmer | June 23, 1942 |
| 2,295,092 | Offen | Sept. 8, 1942 |